United States Patent [19]

Meurer et al.

[11] Patent Number: 5,658,212
[45] Date of Patent: Aug. 19, 1997

[54] CHAIN TENSIONER FOR AUTOMOTIVE ENGINE

[75] Inventors: Josef Meurer, Troisdorf; Hans-Walter Metz, Pulheim; Gottfried Weber, Cologne; Gerd Schwertfirm, Lohmar, all of Germany

[73] Assignee: Ford Motor Company, Dearborn, Mich.

[21] Appl. No.: 562,483

[22] Filed: Nov. 24, 1995

[30] Foreign Application Priority Data

Dec. 3, 1994 [DE] Germany .................. 44 43 095.7

[51] Int. Cl.$^6$ .................................................. F16H 7/08
[52] U.S. Cl. ........................... 474/110; 474/111; 474/135
[58] Field of Search ............................. 474/110, 111, 474/135, 138

[56] References Cited

U.S. PATENT DOCUMENTS

| | | |
|---|---|---|
| 3,407,674 | 10/1968 | Pearce et al. |
| 4,277,240 | 7/1981 | Kraft ............................... 474/110 |
| 4,539,001 | 9/1985 | Okabe ........................... 474/110 X |
| 5,030,169 | 7/1991 | Kiso et al. ........................ 474/110 |
| 5,117,786 | 6/1992 | Tremiel et al. ................ 474/110 X |

OTHER PUBLICATIONS

Krafthand, Issue 2, p. 38, 1964.

*Primary Examiner*—Roger J. Schoeppel
*Attorney, Agent, or Firm*—Jerome R. Drouillard

[57] ABSTRACT

A chain tensioner damps high-frequency chain vibrations by a preloaded damping element in the form of a basic piston, which is augmented by an elastomeric damping element.

8 Claims, 2 Drawing Sheets

CHAIN TENSIONER FOR AUTOMOTIVE ENGINE

BACKGROUND OF THE INVENTION

1. Technical Field

The present invention is related to a chain tensioner, particularly of the type used for controlling the operating tension in timing chains which operate valve gear in automotive internal combustion engines.

2. Prior Art

Chain and belt tensioners are known, for example, from U.S. Pat. No. 3,407,674; and German DEOS 23 33 688; DE-PS 908 694; DE-PS 40 01 303; DE-PS 40 01 304; DE-PS 22 12 818; DE-PS 25 25 352; or DE-OS 25 57 109. Commonly, a piston moving back and forth in a cylinder is preloaded by mechanical or hydraulic means in such a way that its free end protruding from the open end of the cylinder rests on a chain so as to produce a predetermined amount of tension. This should cause the chain to be under tension over its entire travel, in order to minimize wear and to damp vibration and noise.

Chain tensioners provided in internal combustion engines respond to longitudinal stretching of the chain and control longitudinal and transverse vibrations of the chain, which may be caused by excitations arising from the camshaft, the crankshaft and associated components. The damping behavior of known chain tensioners, which place the chain under spring load and hydraulic support, is generally dependent upon a leakage flow between the cylinder wall and the piston. High-frequency load impacts and the corresponding high-frequency chain vibrations are unsatisfactorily damped, which has a negative effect on the mechanical efficiency and service life of such dampers.

The present invention provides a chain tensioner which attenuates high-frequency vibrations by means of a pressure-loaded attenuation device interposed between the mechanical and hydraulic tensioning device and the closed end of the cylinder housing. A chain tensioner according to the present invention has a mechanical and hydraulic preloading device to which "impacts" coming from the chain are first imparted. The impacts are partially compensated or attenuated by the mechanical and hydraulic preloading device. Noncompensated impacts, especially high-frequency vibrations, are transmitted to the basic piston and then compensated via the attenuation element positioned in series with a basic piston. Thus, the invention deals with a series connection of two attenuation devices, whereby the first attenuation device facing the chain is supported by the parallel arrangement of an attenuation device and a mechanical preloading device (spring) and a hydraulic attenuation device, whereby the attenuation is designed such that those vibrations which are not compensated by the mechanical/hydraulic preloading device acting as parallel circuit, that is, in particular, high-frequency vibrations, upon which the hydraulic fluid acts as a rigid body, thereby transmitting the vibrations to the attenuation device provided according to the invention and damped there.

In a preferred embodiment of the invention, the previously described attenuation device may comprise an elastomeric damping element which is under pressure preload, and which has one end resting against the closed end of the cylinder and another end contacting a front end area of a basic piston placed in the cylinder, whereby the piston is supported via the mechanical/hydraulic preloading device against the other front end of the basic piston.

The preloading of the damping element can be triggered by pressing together the elastic material and fixing it by means of a preloading device. Preferably, the preloading device for the attenuation element has a preloading end collar with its outer periphery inside a groove in the cylinder interior wall and runs transversely to the cylinder longitudinal direction, and which holds the elastic damping element under pressure preload.

DETAILED DESCRIPTION OF PREFERRED EMBODIMENTS

Figure 1:
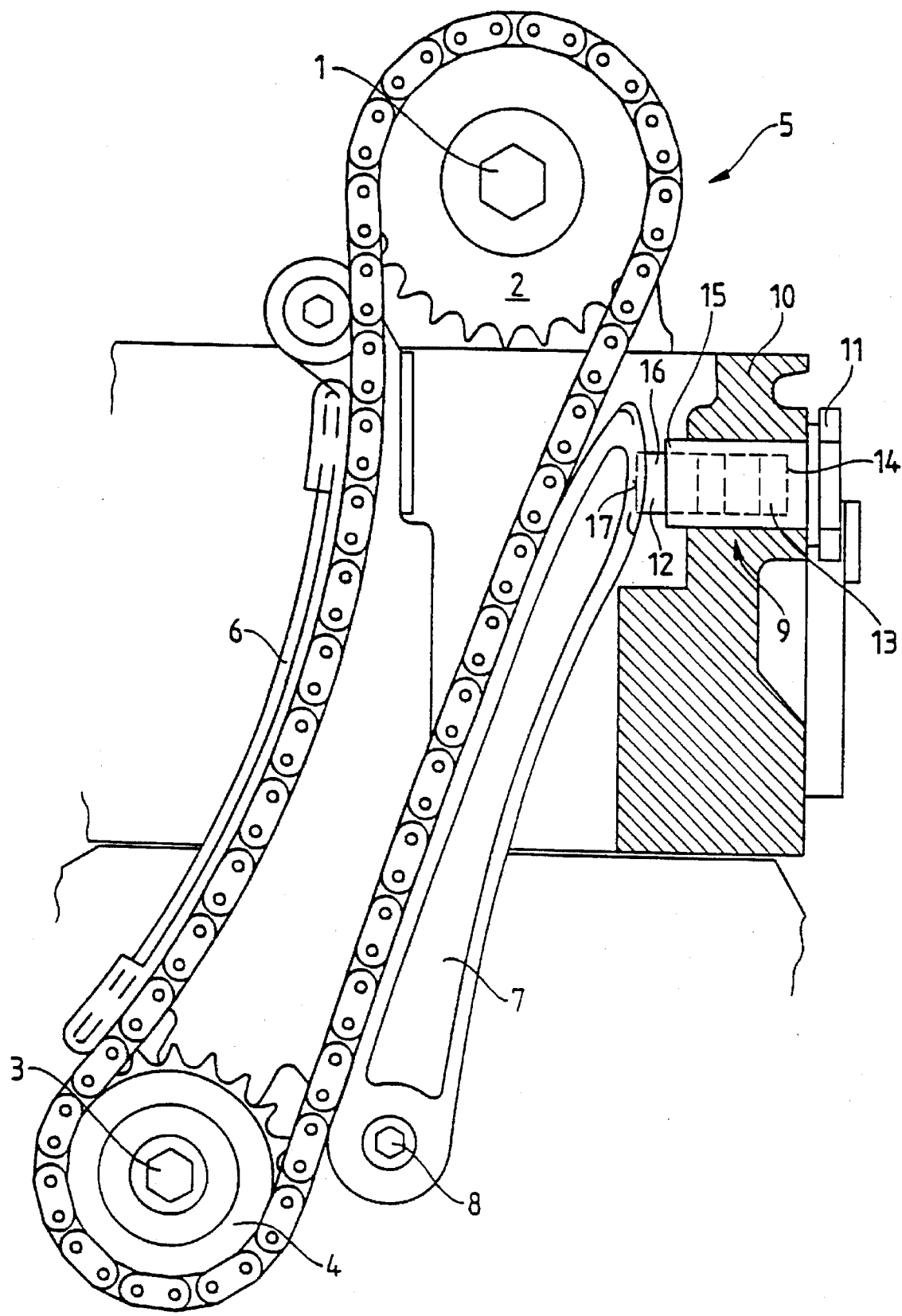
FIG. 1 is a schematic illustration of a part of an internal combustion engine with a continuously running chain led over the gears of a drive shaft and a camshaft.

FIG. 1 shows a schematic partial section of an internal combustion engine. Sprocket 2 is mounted on camshaft 1, and sprocket 4 is mounted on drive shaft 3. Chain 5 is trained over sprockets 2 and 4. On one side, chain 5 lies against chain guide 6, and on the other side against rail tensioner 7, which at 8 can be pivoted under the effect of chain tensioner 9. Chain-tensioner 9 has a basic body 11, solidly mounted on engine housing 10, and piston 12, which moves back and forth in cylinder 13 within basic body 11.

Cylinder 13 has open end 15, through which piston 12, having a tip, 16, protrudes. Tip 16 has a bearing surface, 17, which contacts rail tensioner 7.

Figure 2:
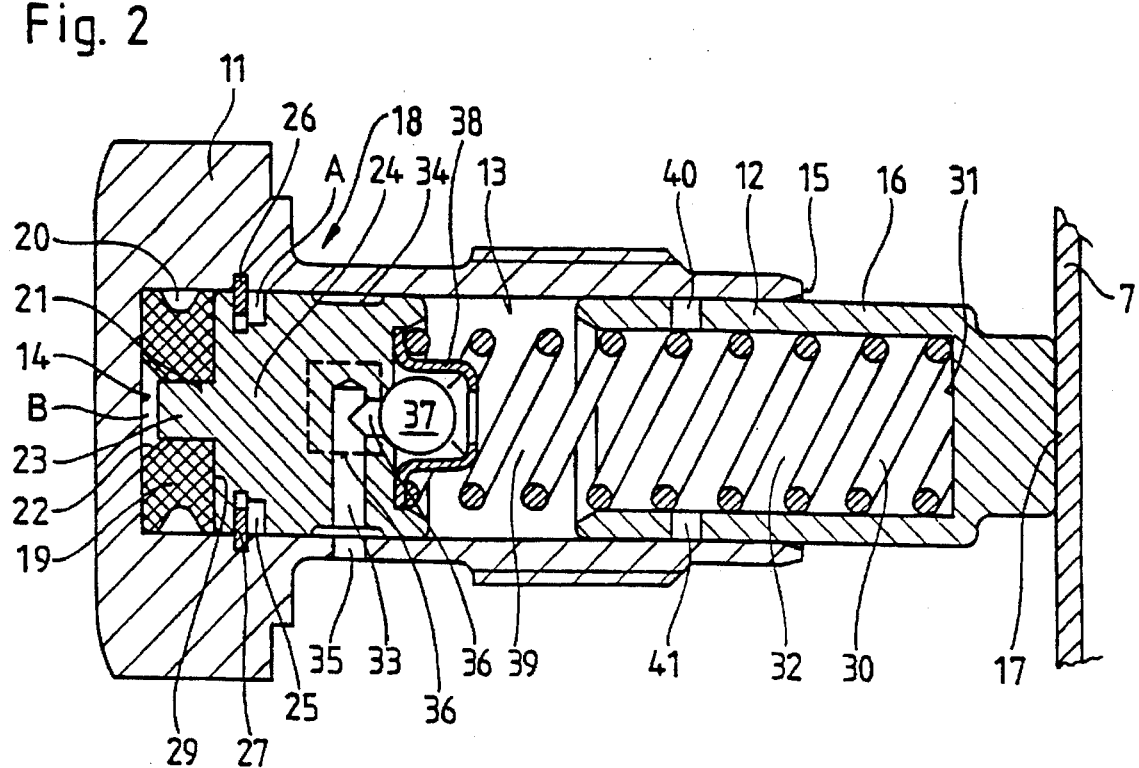
FIGS. 2 and 3 are longitudinal cross sections of two different embodiments a chain tensioner according to the present invention.

FIG. 2, as noted above, illustrates a first embodiment in which attenuation device 18 rests against closed end 14 of cylinder 13. Attenuation device 18 has damping element 19, which is made of an elastomeric material, and which carries annular groove 20 on its periphery. Damping element 19 further has central opening 21 which ends in a widening space 22. Central opening 21 is filled by stop pin 23, which, in the present embodiment, forms a single unit with the basic piston 24.

Basic piston 24 carries recess 25 whose left end, as shown in FIG. 2, rests against preloading collar ring 26, which, in turn, is inserted in groove 27 in interior wall of cylinder 13 and which runs transversely to the cylinder's longitudinal direction. Damping element 19 rests with its front side turned away from the closed end of cylinder 13, against surrounding edge 29 of basic piston 24 and, under the effect of preloading collar ring 26, is held under a preload pressure applied during assembly.

The stroke travel allowance of basic piston 24 is determined by the distance A between preloading collar ring 26 facing surface of the recess in basic piston 24, or, optionally, by the distance B between the free front end of the stop pin 23 and the closed end of cylinder 13.

A mechanical and hydraulic preloading device is provided between basic piston 24 and piston 12. The mechanical preloading device of piston 12 comprises spring 30, which is supported with one end against the bottom 31 of a cylindrical recess 32 inside piston 12, with its other end against basic piston 24.

Oil feed duct 33 is provided in basic piston 24 for a hydraulic supply for feeding the hydraulic medium by means of an annular groove 34 and an oil supply line 35. Oil supply duct 33 ends in oil supply chamber 36, which is connected to the interior of the cylinder 13, designated as pressure chamber 39, by means of a feedback valve with a spring loaded ball 37 held in a ball retainer 38, and the interior recess 32. Openings 40 and 41 in piston 12 allow an appropriate leakage (flow) between cylinder 13 and piston 12.

When an internal combustion engine having the present system is started up, pressurized oil arrives in oil supply chamber 36 through supply duct 33. At the same time, spring 30 urges piston 12 in the direction of rail tensioner 7, whereby the pressure in pressure chamber 39 is reduced. The check valve is set so that a connection between oil supply chamber 36 and pressure chamber 39 is released when the pressure difference between the oil supply chamber and the pressure chamber reaches a predetermined value. When the check valve is open, the pressurized oil arrives in the pressure chamber 39. This causes the piston 12 to move in the direction toward rail tensioner 7, and chain 5 is tightened. As a result of the force exerted by chain 5 on rail tensioner 7 and thereby on piston 12, a pressure builds up in pressure chamber 39. As soon as this pressure exceeds the pressure of the compressed oil, the check valve shuts off. Through the provided leakage for the pressurized oil in the annular gap between the piston 12 and the cylinder 13 of the basic body 11, oil flows from pressure chamber 39, which produces movement of the piston and which has a damping effect.

High frequency chain loads and chain vibrations which are not compensated by the mechanical and hydraulic preloading device, are carried by the hydraulic medium in pressure chamber 39 and/or by spring 30 to the movable basic piston 24 and then to the preloaded damping element 19 and are effectively absorbed by the latter. The damping property can be set by the selection of the materials of the damping element and by the preload pressure imposed on the damping element. Additional damping may be produced by employing element 19 as a hydro-damped element by sizing the outside diameter of element 19 so as to allow oil to enter annular groove 20 such that axial compression of element 19 is accompanied by leakage of oil from the annular groove.

Figure 3:
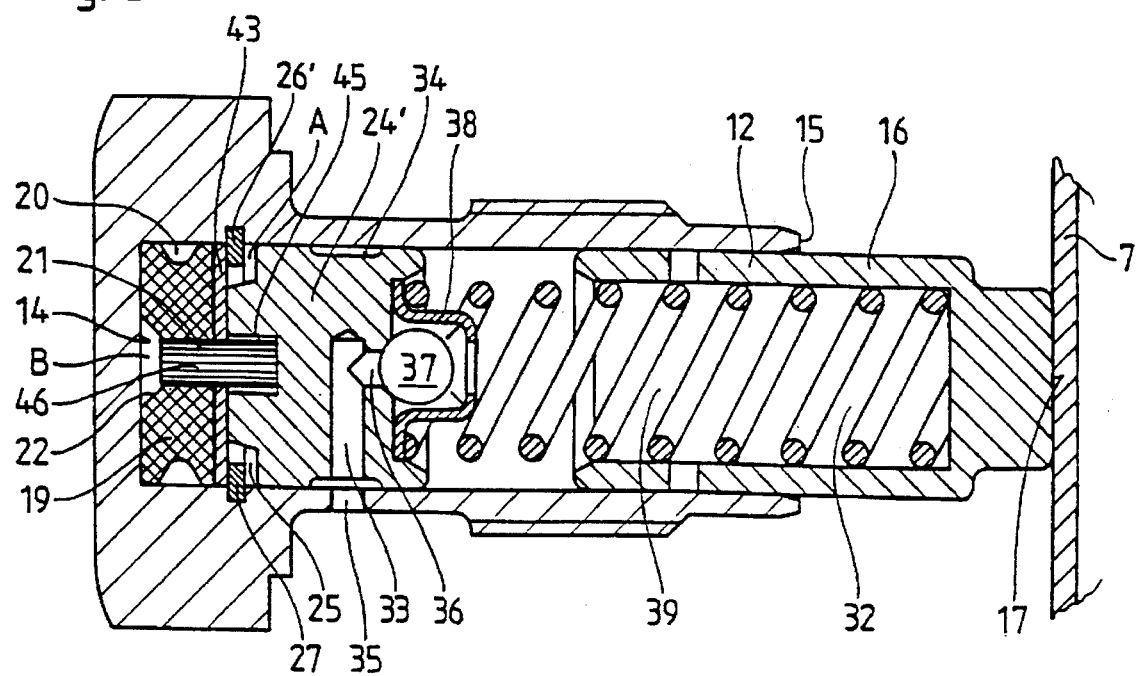

In a second embodiment of the present invention, shown in FIG. 3, identical parts to FIG. 2 are indicated with the same reference numbers and are not explained again in detail. As shown in FIG. 3, preload check ring 27 rests against washer 43, which, in turn, rests against the front end of the damping element 19 turned away from closed end 14. Differently from FIG. 2, the basic piston, here indicated with 24', has interior recess 45 in which stop pin 46, which is mounted on washer 43, protrudes.

In both of the illustrated embodiments, basic piston 24 or 24' rests directly or indirectly against the damping element 19, with the result that high-frequency vibrations, which may occur in basic body 11 when the corresponding front end of the basic piston strikes against closed end 14 of cylinder 13, are greatly damped, so that practically no high-frequency vibrations occur at the passage of the basic piston 24 or 24' to closed end 14 of cylinder 13, whereby the durability life of the chain tensioning device is extended and the mechanical efficiency of the chain drive is improved.

While the invention has been shown and described in its preferred embodiments, it will be clear to those skilled in the arts to which it pertains that many changes and modifications may be made thereto without departing from the scope of the invention.

What is claimed is:

1. A chain tensioner for an internal combustion engine, comprising a cylinder (13) provided in a main body (11) with a closed end (14) and an open end (15) and a piston (12), moving back and forth, lodged in the cylinder, whose one end (17) protruding from the open end of the main body is supported against the chain to be tightened, and whose other end, via a mechanical and hydraulic preloading device, rests against a pressurized damping element (18) situated between the mechanical preloading device and the closed end (14) of the cylinder (13).

2. A chain tensioner according to claim 1, wherein the stroke travel of the damping device (18) is limited by a stroke-limiting device.

3. A chain tensioner according to claim 2, wherein said stroke-limiting device has a stop ring (23, 46) extending through an opening in said damping element (19) and extending in longitudinal direction of the stroke travel, whose end facing the closed end (14) of the cylinder is spaced by a distance (B) to the closed end (14) of the cylinder, in its rest position.

4. A chain tensioner according to claim 1, wherein said damping element (18) has a preloaded elastic damping element (19), resting, on the one side, against the closed end (14) of the cylinder (13) and, on the other side, against the front end of a main piston (24, 24') placed in the cylinder, and the piston (12) is supported against the other front end of the main piston by means of the mechanical and hydraulic preloading device.

5. A chain tensioner according to claim 1, wherein said damping element (19) is provided with an annular groove (20) around its periphery.

6. A chain tensioner according to claim 1, wherein said damping element (19) comprises elastomeric body.

7. A chain tensioner according to claim 1, wherein said damping element comprises an hydro-damped rubber restoring element.

8. A chain tensioner according to claim 1, wherein the damping element comprises a spring with hydraulic valving.

* * * * *